(12) United States Patent
Matsuoka

(10) Patent No.: US 8,440,364 B2
(45) Date of Patent: May 14, 2013

(54) MEMBRANE ELECTRODE ASSEMBLY AND FUEL CELL

(75) Inventor: Koji Matsuoka, Moriguchi (JP)

(73) Assignee: Sanyo Electric Co., Ltd., Osaka (JP)

(*) Notice: Subject to any disclaimer, the term of this patent is extended or adjusted under 35 U.S.C. 154(b) by 295 days.

(21) Appl. No.: 12/934,514

(22) PCT Filed: Mar. 6, 2009

(86) PCT No.: PCT/JP2009/001034
§ 371 (c)(1),
(2), (4) Date: Sep. 24, 2010

(87) PCT Pub. No.: WO2009/119017
PCT Pub. Date: Oct. 1, 2009

(65) Prior Publication Data
US 2011/0020726 A1    Jan. 27, 2011

(30) Foreign Application Priority Data

Mar. 24, 2008  (JP) .................................. 2008-076830

(51) Int. Cl.
*H01M 4/86*    (2006.01)
*H01M 8/02*    (2006.01)
*H01M 8/10*    (2006.01)

(52) U.S. Cl.
USPC ....................................................... 429/483

(58) Field of Classification Search ............... 429/483
See application file for complete search history.

(56) References Cited

U.S. PATENT DOCUMENTS

2005/0186467 A1 *  8/2005  Sugiura ........................... 429/42
2009/0136808 A1 *  5/2009  Kang et al. ...................... 429/27

FOREIGN PATENT DOCUMENTS

| JP | 09213350 A | * | 8/1997 |
| JP | 2002-025560 | | 1/2002 |
| JP | 2002-110202 | | 4/2002 |
| JP | 2002-203569 | | 7/2002 |
| JP | 2005-026174 | | 1/2005 |
| JP | 2005-149852 | | 6/2005 |
| JP | 2005-267902 | | 9/2005 |
| JP | 2005-310714 | | 11/2005 |
| JP | 2006-120606 | | 5/2006 |
| JP | 2008140608 A | * | 6/2008 |
| JP | 2008-277094 | | 11/2008 |
| JP | 2008-311180 | | 12/2008 |
| JP | 2009-043688 | | 2/2009 |

OTHER PUBLICATIONS

International Preliminary Report on Patentability and Written Opinion of the International Searching Authority issued in PCT/JP2009/001034, mailed Nov. 18, 2010.

* cited by examiner

*Primary Examiner* — Gregg Cantelmo
(74) *Attorney, Agent, or Firm* — McDermott Will & Emery LLP

(57) ABSTRACT

A membrane electrode assembly includes an solid polymer electrolyte membrane, an anode, and a cathode. The cathode has a stacked body of a catalyst layer and a gas diffusion layer. The catalyst layer has platinum-cobalt-supporting carbon particles and an ion conductor. The ratio (P2/P1) of the pore volume P2 (ml/g) per gram of catalyst layer in a second micro-pore diameter, ranging from 0.1 μm to less than 1 μm, over the pore volume P1 per gram of catalyst layer in a first micro-pore diameter, ranging from 0.01 μm to less than 0.1 μm, is in a range of 3.8 to 8.3.

8 Claims, 3 Drawing Sheets

10

US 8,440,364 B2

MEMBRANE ELECTRODE ASSEMBLY AND FUEL CELL

RELATED APPLICATIONS

This application is the U.S. National Phase under 35 U.S.C. §371 of International Application No. PCT/JP2009/001034, filed on Mar. 6, 2009, which in turn claims the benefit of Japanese Application No. 2008-076830, filed on Mar. 24, 2008, the disclosures of which Applications are incorporated by reference herein.

TECHNICAL FIELD

The present invention relates to a fuel cell for generating electric power by an electrochemical reaction between hydrogen and oxygen.

BACKGROUND TECHNOLOGY

Recently much attention has been focused on fuel cells that feature not only high energy conversion efficiency but also no hazardous substance produced by the electricity-generating reaction. Known as one of such fuel cells is the polymer electrolyte fuel cell which operates at a low temperature of 100° C. or below.

A polymer electrolyte fuel cell, which has a basic structure of a solid polymer electrolyte membrane disposed between a fuel electrode and an air electrode, generates power through an electrochemical reaction as described below by supplying a fuel gas containing hydrogen to the fuel electrode and an oxidant gas containing oxygen to the air electrode.

Fuel electrode: $H_2 \rightarrow 2H^+ + 2e^-$     (1)

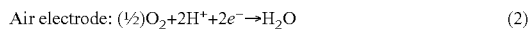

Air electrode: $(½)O_2 + 2H^+ + 2e^- \rightarrow H_2O$     (2)

The anode and the cathode have each a stacked structure of a catalyst layer and a gas diffusion layer. And a fuel cell is composed of catalyst layers of the respective electrodes disposed counter to each other in such a manner as to hold a solid polymer membrane therebetween. The catalyst layer is a layer of a catalyst or carbon particles carrying a catalyst bound together by an ion-exchange resin. The gas diffusion layer serves as a passage for the oxidant gas or the fuel gas.

At the anode, the hydrogen contained in the supplied fuel is decomposed into hydrogen ions and electrons as expressed in the above formula (1). Of them, the hydrogen ions travel inside the solid polymer electrolyte membrane toward the air electrode, whereas the electrons travel through an external circuit to the air electrode. At the cathode, on the other hand, the oxygen contained in the oxidant gas supplied thereto reacts with the hydrogen ions and electrons having come from the fuel electrode to produce water as expressed in the above formula (2). In this manner, the electrons travel from the fuel electrode toward the air electrode in the external circuit, so that the electric power is extracted therefrom (See Patent Document 1).

[Patent Document 1] Japanese Patent Publication No. 2002-203569.

DISCLOSURE OF THE INVENTION

Problems to be Solved by the Invention

The water retentivity and the gas diffusibility are required of a cathode catalyst layer. However, as the water retentivity rises, there will be an increased likelihood of a clogged drain and therefore the gas deffusibility is hindered. In the light of this, establishing a technology that satisfies both the water retentivity and the gas diffusibility has been a major issue.

The present invention has been made in view of the foregoing problems, and a purpose thereof is to provide a technology capable of improving the gas diffusibility of cathode catalyst layers and raising the cell voltage.

Means for Solving the Problems

One embodiment of the present invention relates to a membrane electrode assembly. The membrane electrode assembly includes: an electrolyte membrane; an anode disposed on one face of the electrolyte membrane; and a cathode disposed on the other face of the electrolyte membrane, wherein the cathode contains a catalyst layer such that the ratio of a pore volume in a second micro-pore diameter over a pore volume in a first micro-pore diameter is in a range of 3.8 to 8.3, the first micro-pore diameter ranging from 0.01 μm to less than 0.1 μm and the second micro-pore diameter ranging from 0.1 μm to less than 1 μm.

By employing the membrane electrode assembly according to this embodiment, a sufficient gas diffusibility of catalyst layer constituting the cathode can be achieved and consequently the output voltage can be increased.

In the membrane electrode assembly according to the above-described embodiment, the catalyst layer may contain a platinum-alloy-supported catalyst. The catalyst layer may contain an ion conductor whose ion-exchange group equivalent weight (EW value) is less than or equal to 800.

Another embodiment of the present invention relates to a fuel cell. The fuel cell has a membrane electrode assembly according to any one of the above-described embodiments.

It is to be noted that any arbitrary combinations or rearrangement, as appropriate, of the aforementioned constituting elements and so forth are all effective as and encompassed by the embodiments of the present invention.

Effect of the Invention

The present invention enhances the gas diffusibility of cathode catalyst layers and raises the cell voltage.

DESCRIPTION OF THE REFERENCE NUMERALS

Figure 1:
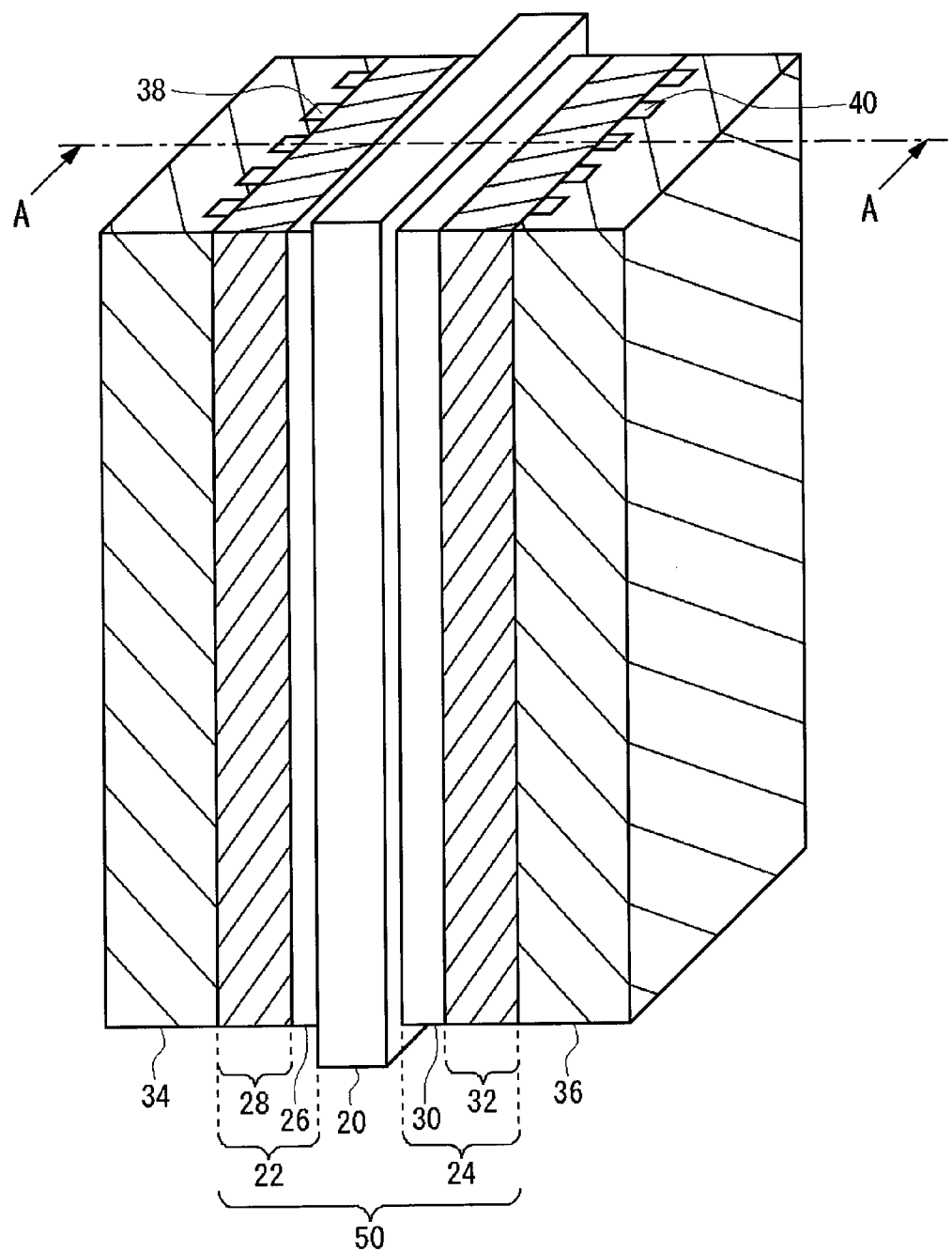
FIG. 1 is a perspective view schematically illustrating a structure of a fuel cell 10 according to an embodiment of the present invention.

10 Fuel cell
20 Solid polymer electrolyte membrane
22 Anode
24 Cathode
26, 30 Catalyst layers
28, 32 Gas diffusion layers
50 Membrane electrode assembly

BEST MODE FOR CARRYING OUT THE INVENTION

Hereinbelow, the embodiments will be described with reference to the accompanying drawings. Note that the identical components are given the identical reference numerals in all accompanying Figures and the repeated description thereof will be omitted as appropriate.

Embodiment

Figure 2:
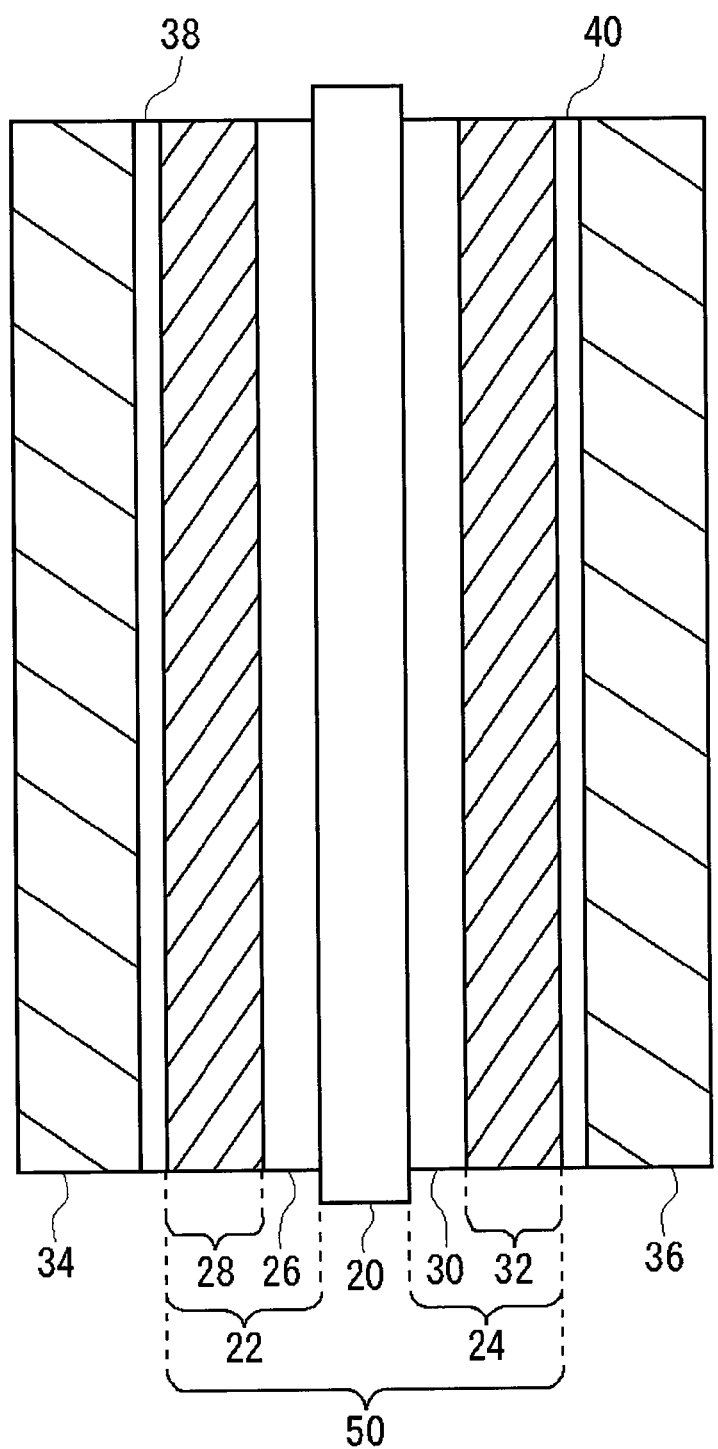
FIG. 2 is a cross-sectional view taken on the dotted line A-A of FIG. 1.

FIG. 1 is a perspective view schematically illustrating a structure of a fuel cell 10 according to an embodiment of the present invention. FIG. 2 is a cross-sectional view taken on the dotted line A-A of FIG. 1. The fuel cell 10 is comprised of a plate-like membrane electrode assembly 50, a separator 34 on one side of the membrane electrode assembly 50, and a separator 36 on the other side thereof. Although only one membrane electrode assembly 50 is shown in this example, the fuel cell 10 may be composed of a plurality of stacked membrane electrode assemblies 50 with separators 34 or separators 36 disposed therebetween. The membrane electrode assembly 50 includes a solid polymer electrolyte membrane 20, an anode 22, and a cathode 24.

The anode 22 has a stacked body comprised of a catalyst layer 26 and a gas diffusion layer 28. On the other hand, the cathode 24 has a stacked body comprised of a catalyst layer 30 and a gas diffusion layer 32. The catalyst layer 26 of the anode 22 and the catalyst layer 30 of the cathode 24 are disposed counter to each other with the solid polymer electrolyte membrane 20 held therebetween.

The separator 34 on the anode 22 side is provided with gas channels 38. From a manifold (not shown) for supplying fuel, the fuel gas is distributed to the gas channels 38 and supplied to the membrane electrode assembly 50 through the gas channels 38. Similarly, the separator 36 on the cathode 24 side is provided with gas channels 40.

From a manifold (not shown) for supplying an oxidant, the oxidant gas is distributed to the gas channels 40 and supplied to the membrane electrode assembly 50 through the gas channels 40. More specifically, when the fuel cell 10 is operating, the fuel gas, such as hydrogen gas, is supplied to the anode 22 as the fuel gas flows downward through the gas channels 38 along the surface of the gas diffusion layer 28.

At the same time, when the fuel cell 10 is operating, the oxidant gas, such as air, is supplied to the cathode 24 as the oxidant gas flows downward through the gas channels 40 along the surface of the gas diffusion layer 32. As the hydrogen gas is supplied to the catalyst layer 26 through the gas diffusion layer 28, the hydrogen in the gas is turned into protons, and the protons travel through the solid polymer electrolyte membrane 20 to the cathode 24 side. Electrons released at this time move to an external circuit and then flow into the cathode 24 from the external circuit. On the other hand, as air is supplied to the catalyst layer 30 through the gas diffusion layer 32, the oxygen combines with the protons, thus turning into water. As a result, electrons flow from the anode 22 to the cathode 24 in the external circuit, so that the electric power can be extracted therefrom.

The solid polymer electrolyte membrane 20, which displays an excellent ion conductivity in a damp condition, functions as an ion-exchange membrane that allows transfer of protons between the anode 22 and the cathode 24. The solid polymer electrolyte membrane 20 may be formed of a solid polymer material of fluorine-containing polymer or nonfluorine polymer, which may be, for example, a sulfonic acid type perfluorocarbon polymer, a polysulfone resin, or a perfluorocarbon polymer having a phosphonic acid group or carboxylic acid group. One example of a sulfonic acid type perfluorocarbon polymer is Nafion ionomer dispersion (made by DuPont: registered trademark) 112. Also, examples of non-fluorine polymer may be a sulfonated aromatic polyether ether ketone or polysulfone. The film thickness of the solid polymer electrolyte membrane 20 is typically 50 μm.

The catalyst layer 26 constituting a part of the anode 22 is comprised of an ion conductor (ion-exchange resin) and carbon particles supporting a catalyst, namely catalyst-supporting carbon particles. The thickness of the catalyst layer 26 is typically 10 μm. The ion conductor plays a role of connecting the carbon particles supporting an alloy catalyst with the solid polymer electrolyte membrane 20 to allow the transfer of protons between the two. The ion conductor may be formed of a polymer material similar to the solid polymer electrolyte membrane 20.

The alloy catalyst used for the catalyst layer 26 may be, for example, a precious metal and ruthenium. A precious metal used for the alloy catalyst may be, for example, platinum, palladium, or the like. Also, the carbon particles supporting such an alloy catalyst may be acetylene black, ketjen black, carbon nanotube, carbon nano-onion, or the like.

The ion-exchange group equivalent weight (EW value) of the ion conductor is preferably 800 or below. If the EW value is set accordingly, a sufficient proton conductivity can be obtained and the water content of the catalyst layer 26 can be increased.

The gas diffusion layer 28 constituting another part of the anode 22 includes an anode gas diffusion substrate and a microporous layer applied to the anode gas diffusion substrate. Preferably, the anode gas diffusion substrate is made of a porous material having an electron conductivity, which may, for instance, be a carbon paper or woven or nonwoven cloth of carbon.

The microporous layer applied to the anode gas diffusion substrate is a pasty material derived by kneading an electrically conductive powder and a water repellent agent together. The electrically conductive powder may be carbon black, for instance. The water repellent agent that can be used may be a fluorine-based resin such as tetrafluoroethylene resin (polytetrafluoroethylene (PTFE)). Note that the water repellent agent preferably has a binding property. The binding property meant here is a property that can create a condition of cohesive bond of less viscous and easily crumbling materials together. With the cohesiveness of the water repellent agent, the electrically conductive powder and the water repellent agent can be kneaded together into a paste.

The catalyst layer 30 constituting a part of the cathode 24 is comprised of an ion conductor (ion-exchange resin) and carbon particles supporting a catalyst, namely catalyst-supporting carbon particles. The ion conductor plays a role of connecting the carbon particles supporting a catalyst with the solid polymer electrolyte membrane 20 to allow the transfer of protons between the two. The ion conductor may be formed of a polymer material similar to the solid polymer electrolyte membrane 20. The catalyst to be supported may be platinum-alloy, for instance. A metal used for the platinum-alloy may be, for example, cobalt, nickel, iron, manganese, iridium, and the like. Also, the carbon particles supporting such an alloy catalyst may be acetylene black, ketjen black, carbon nanotube, carbon nano-onion, or the like.

The catalyst layer 30 has micro pores whose diameter lies in the range of 0.01 μm to 1 μm. A micro-pore diameter (size) ranging from 0.01 μm to less than 0.1 μm is called a first micro-pore diameter. A micro-pore diameter ranging from 0.1 μm to less than 1 μm is called a second micro-pore diameter. The micro-pore diameter may be measured using a mercury intrusion technique, for instance.

The ratio (P2/P1) of the pore volume P2 (ml/g) per gram of catalyst layer in the second micro-pore diameter over the pore volume P1 per gram of catalyst layer in the first micro-pore diameter is preferably in a range of 3.8 to 8.3 ($3.8 \leq P2/P1 \leq 8.3$) and more preferably in a range of 4.0 to 7.0 ($4.0 \leq (P2/P1) \leq 7.0$). For a conventional catalyst layer, the ratio P2/P1 is about 3.5 to about 3.7, and the output voltage is about 745 mV. Setting the ratio P2/P1 to 3.8 or above results in an improvement of the gas diffusibility, so that an output voltage higher than that of a fuel cell using the conventional catalyst layer can be obtained. On the other hand, if the ratio P2/P1 becomes larger than 8.3, a clogged drain is more likely to occur and therefore the output voltage will be lower than that of the fuel cell using the conventional catalyst layer. Setting the ratio P2/P1 in a range of 4.0 to 7.0 suppresses the adverse effect of clogged drain and, at the same time, an output voltage higher, by 4% to 6%, than that of the fuel cell using the conventional catalyst layer can be obtained.

Pores each having the first micro-pore diameter are formed by gaps (spaces) formed among catalyst-supporting carbon particles. On the other hand, pores each having the second micro-pore diameter are formed, for example, such that a foaming agent and/or a pore forming agent are/is added to the catalyst layer and then the foaming agent and/or pore forming agent are/is removed by thermal decomposition or the like. The second micro-pore diameter can be adjusted by the median size of the foaming agent and/or pore forming agent. For example, if the median size of the foaming agent ranges from 0.01 μm to 100 μm, pores whose size ranges from 0.1 μm to less than 1 μm can be formed in the catalyst layer 30. The pore volume per gram of catalyst layer can be adjusted by adjusting the amount of foaming agent and the like to be added. For example, the amount of forming agent and the like to be added is preferably 0.01 wt. % to 20 wt. % of the total weight of the catalyst.

The gas diffusion layer 32 constituting another part of the cathode 24 includes a cathode gas diffusion substrate and a microporous layer applied to the cathode gas diffusion substrate. Preferably, the cathode gas diffusion substrate is made of a porous material having an electron conductivity, which may, for instance, be a carbon paper or woven or nonwoven cloth of carbon.

The microporous layer applied to the cathode gas diffusion substrate is a pasty material derived by kneading an electrically conductive powder and a water repellent agent together. The electrically conductive powder may be carbon black, for instance. The water repellent agent that can be used may be a fluorine-based resin such as tetrafluoroethylene resin (polytetrafluoroethylene). Note that the water repellent agent preferably has a binding property. With the cohesiveness of the water repellent agent, the electrically conductive powder and the water repellent agent can be kneaded together into a paste.

By employing the above-described membrane electrode assembly 50 or fuel cell 10, a sufficient gas diffusibility of the catalyst layer 30 constituting the cathode 24 can be achieved and moreover the output voltage of the fuel cell 10 can be increased. If in particular a platinum alloy catalyst, which is subject to water flooding, is used for the catalyst layer 30 or an ion conductor whose EW value, namely the water content, is low is used for the catalyst layer 30, a sufficient gas diffusibility of the catalyst layer 30 can be achieved.

(Fabrication Method of Membrane Electrode Assembly)

A method for manufacturing a membrane electrode assembly according to an embodiment will now be described.

<Fabrication of Cathode Catalyst Slurry>

Platinum-cobalt-supporting carbon (element ratio of platinum to cobalt is 3:1, Tanaka Kikinzoku Kogyo) is used as the cathode catalyst. An ionomer solution Aciplex (registered trademark) and an SS700C/20 solution (20%, EW value=780, water content ratio of 26 wt. % at 25° C.) by Asahi Kasei Chemicals Corp. (hereinafter abbreviated as "SS700") are used as the ion conductor. 10 mL of ultrapure water is added to 5 g of platinum-cobalt-supporting carbon and stirred. Then, 15 mL of ethanol and 0.5 g of a forming agent Cellborn SC-C (Eiwa Chemical Ind. Co., Ltd.) are added thereto. The second micro-pore diameter can be adjusted by the median size of the foaming agent to be added. The amount of foaming agent to be added is preferably 0.01 wt. % to 20 wt. % of the weight of the catalyst and more preferably 0.5 wt. % to 1 wt. % thereof.

This catalyst dispersion solution is stirred and dispersed ultrasonically for more than an hour using an ultrasonic stirrer. A predetermined amount of SS700 solution is diluted with the same amount of ultrapure water as SS700 and stirred by means of a glass rod for three minutes. Then, the SS700 solution diluted with water is dispersed ultrasonically for an hour using an ultrasonic cleaner so as to obtain the SS700 solution. Then, the SS700 solution is slowly dripped into the catalyst dispersion solution. During the dripping, the catalyst dispersion solution with the SS700 solution dripped thereinto is continuously stirred using the ultrasonic stirrer. After the dripping of SS700 solution has completed, a 10 g mixed solution of 1-propanol and 1-butanol (the weight ratio being 1:1) is dripped thereinto and the thus obtained solution is used as the cathode catalyst slurry. During the mixture process, the liquid temperature is adjusted to be about 60° C. throughout the process and the ethanol is evaporated and removed.

<Fabrication of Cathode Electrode>

The catalyst slurry fabricated by the above-described method is applied to the gas diffusion layer, with the microporous layer attached thereto, fabricated by Vulcan XC72, using a screen printing method (150 meshes). Then the catalyst slurry applied thereto is dried at a temperature of 80° C. for three hours and undergoes a heat treatment for forty five minutes.

<Fabrication of Anode Catalyst Slurry>

A method for manufacturing a catalyst slurry for the anode catalyst layer is the same as the method for manufacturing the cathode catalyst slurry except that platinum-ruthenium-supporting carbon (TEC61E54, Tanaka Kikinzoku Kogyo) is used as the anode catalyst and that no foaming agent is used. SS700 is used as the ion conductor.

<Fabrication of Anode>

The catalyst slurry for a first catalyst layer of anode and the catalyst slurry for a second catalyst layer of anode fabricated by the above-described method are applied, in this order, to the gas diffusion layer, with the microporous layer attached thereto, fabricated by Vulcan XC72, using a screen printing method (150 meshes). Then the catalyst slurries applied thereto are dried at a temperature of 80° C. for three hours and undergoes a heat treatment for forty five minutes.

<Fabrication of Membrane Electrode Assembly>

Hot pressing is performed with the solid polymer electrolyte membrane held between the anode and the cathode fabricated by the above-described methods. Aciplex (registered trademark) (SF7201x, Asahi Kasei Chemicals Corp.) is used as the solid polymer electrolyte membrane. Under a joining condition of 170° C. and 200 second, the solid polymer electrolyte membrane and the cathode are hot-pressed so as to fabricate the membrane electrode assembly.

Example Embodiment

The membrane electrode assembly was manufactured according to the above-described method for fabricating the membrane electrode assembly. The ratio (P2/P1) of the pore volume P2 (ml/g) per gram of catalyst layer in the second micro-pore diameter over the pore volume P1 per gram of catalyst layer in the first micro-pore diameter is varied in the manufacturing of the membrane electrode assembly, and the cell voltage in each varied instance is measured.

Figure 3:
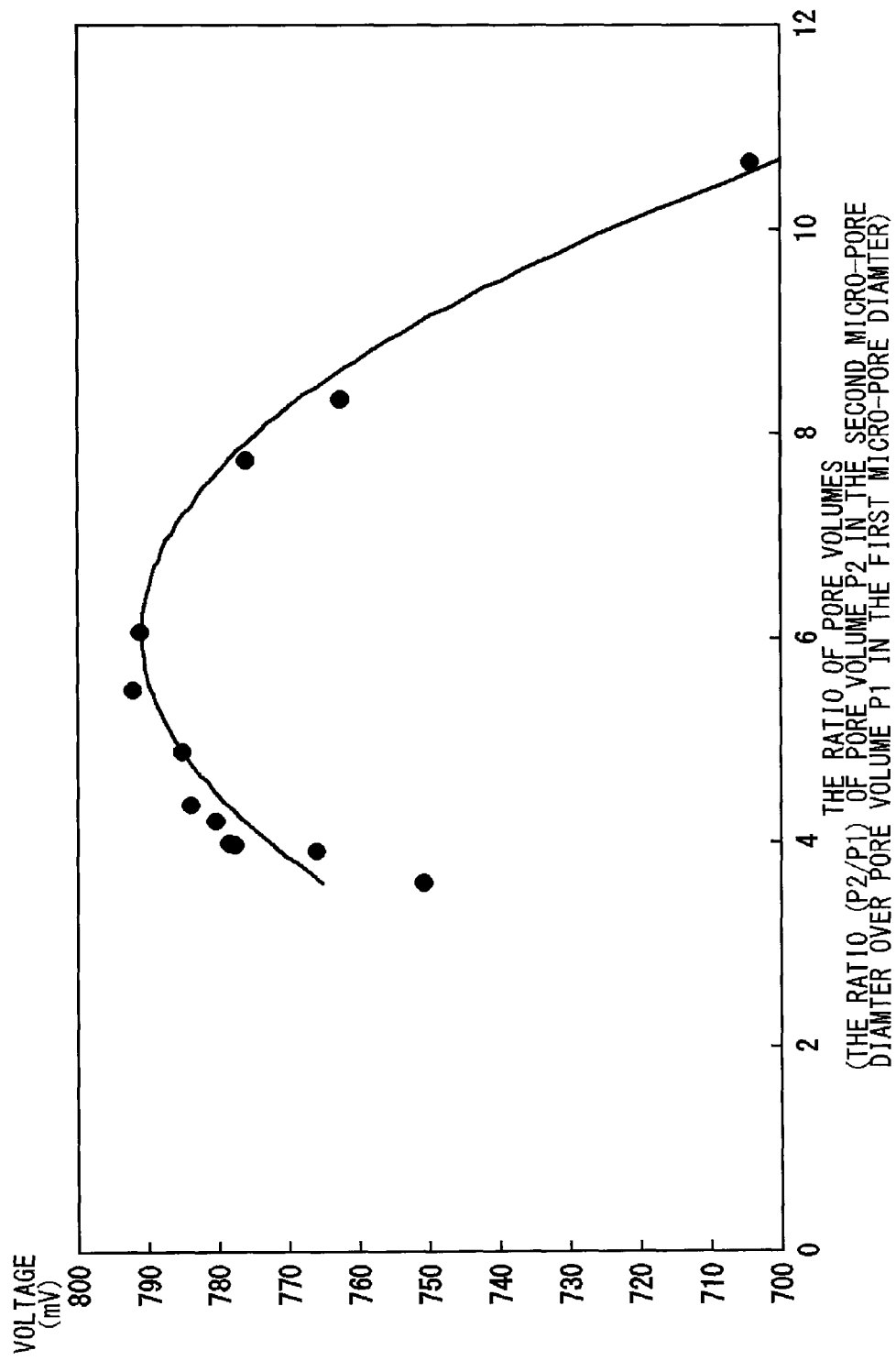
FIG. 3 is a graph showing a relationship between the ratio (P2/P1) of a pore volume in a second micro-pore diameter over a pore volume in a first micro-pore diameter.

FIG. 3 is a graph showing a relation between the ratio (P2/P1) of the pore volume P2 in the second micro-pore diameter over the pore volume P1 in the first micro-pore diameter and the voltage obtained at each varied instance. As shown in FIG. 3, it is verified that, as compared with the output voltage of 745 mV in a conventional case of about 3.5 to 3.7, the voltage becomes higher in a range of the ratio P2/P1 distributed in the example embodiment between 3.8 and 8.3 (both inclusive).

The present invention is not limited to the above-described embodiment and example only, and it is understood by those skilled in the art that various modifications such as changes in design may be made based on their knowledge and the embodiments added with such modifications are also within the scope of the present invention.

In the above-described embodiment, the ratio P2/P1 for the cathode layer is prescribed in a range of 3.8 to 8.3. As for the anode catalyst layer, the ratio P2/P1 for the cathode layer is prescribed in a range of 3.8 to 8.3, too. According to this modification, the gas diffusibility of anode catalyst layers can be improved

INDUSTRIAL APPLICABILITY

The present invention contributes to an improvement in the gas diffusibility of cathode catalyst layers used in a fuel cell.

What is claimed is:

1. A membrane electrode assembly, including:
an electrolyte membrane;
an anode disposed on one face of said electrolyte membrane; and
a cathode disposed on the other face of said electrolyte membrane, wherein:
said cathode contains a catalyst layer such that the ratio of a pore volume in a second micro-pore diameter to a pore volume in a first micro-pore diameter is in a range of 3.8 to 8.3,
the first micro-pore diameter has a range from 0.01 μm to less than 0.1 μm, and
the second micro-pore diameter has a range from 0.1 μm to less than 1 μm.

2. A membrane electrode assembly according to claim 1, wherein the catalyst layer contains a platinum-alloy-supported catalyst.

3. A membrane electrode assembly according to claim 1, wherein the catalyst layer contains an ion conductor having an ion-exchange group equivalent weight (EW value) which is less than or equal to 800.

4. A membrane electrode assembly according to claim 2, wherein the catalyst layer contains an ion conductor having an ion-exchange group equivalent weight (EW value) which is less than or equal to 800.

5. A fuel cell having a membrane electrode assembly according to claim 1.

6. A fuel cell having a membrane electrode assembly according to claim 2.

7. A fuel cell having a membrane electrode assembly according to claim 3.

8. A fuel cell having a membrane electrode assembly according to any one of claim 4.

* * * * *